(12) United States Patent
Choi

(10) Patent No.: US 10,919,373 B2
(45) Date of Patent: Feb. 16, 2021

(54) WEATHER STRIP MOUNTING STRUCTURE FOR DOOR IN VEHICLE

(71) Applicants: Hyundai Motor Company, Seoul (KR); Kia Motors Corporation, Seoul (KR)

(72) Inventor: Je-Won Choi, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 204 days.

(21) Appl. No.: 16/164,025

(22) Filed: Oct. 18, 2018

(65) Prior Publication Data

US 2019/0152307 A1    May 23, 2019

(30) Foreign Application Priority Data

Nov. 20, 2017    (KR) .................. 10-2017-0155118

(51) Int. Cl.
| | | |
|---|---|---|
| *E06B 1/70* | (2006.01) | |
| *B60J 10/30* | (2016.01) | |
| *B60J 10/00* | (2016.01) | |
| *B60R 13/04* | (2006.01) | |
| *B60J 10/86* | (2016.01) | |
| *B60J 10/88* | (2016.01) | |
| *B62D 65/06* | (2006.01) | |

(52) U.S. Cl.
CPC .............. *B60J 10/30* (2016.02); *B60J 10/45* (2016.02); *B60J 10/87* (2016.02); *B60J 10/88* (2016.02); *B60R 13/04* (2013.01); *B62D 65/06* (2013.01)

(58) Field of Classification Search
CPC ... B60J 10/87; B60J 10/45; B60J 10/85; B60J 10/84; B60J 10/80; B60R 13/06; B60R 13/0243; B62D 65/06
USPC ............................ 49/470, 469, 490.1, 493.1
See application file for complete search history.

(56) References Cited

U.S. PATENT DOCUMENTS

| 4,951,418 A * | 8/1990 | Keys .................. B60J 10/24 |
| | | 49/440 |
| 6,926,944 B2 * | 8/2005 | Watanabe ............ B60J 10/242 |
| | | 428/122 |
| 2002/0035806 A1 * | 3/2002 | Yamashita ............ B60J 10/24 |
| | | 49/498.1 |
| 2007/0101657 A1 * | 5/2007 | Okajima .............. B29C 48/154 |
| | | 49/490.1 |
| 2008/0229670 A1 * | 9/2008 | Iwasa .................. B60J 10/16 |
| | | 49/490.1 |

(Continued)

FOREIGN PATENT DOCUMENTS

KR           200472167 Y1    4/2014

*Primary Examiner* — Chi Q Nguyen
(74) *Attorney, Agent, or Firm* — Slater Matsil, LLP

(57) ABSTRACT

A vehicle includes a door and a door frame installed along a circumference of the door. An upper portion of the door frame is joined to an upper end portion of an inner panel. The upper end portion of the door frame is extended toward the inside of the vehicle to form a coupling portion. A weather strip is mounted on the inner panel along the circumference of the door, the weather strip being coupled to the coupling portion of the inner panel. A first coupling element by which one side of the weather strip is fixed is formed at the coupling portion and a second coupling element is coupled with the first coupling element at the coupling portion so that the weather strip is directly coupled with the door frame.

20 Claims, 13 Drawing Sheets

(56) References Cited

U.S. PATENT DOCUMENTS

| | | | |
|---|---|---|---|
| 2009/0223135 A1* | 9/2009 | Bocutto | B60J 10/70 49/493.1 |
| 2010/0001550 A1* | 1/2010 | Janisch | B60J 10/78 296/146.2 |
| 2012/0085029 A1* | 4/2012 | Stockschlager | B60J 10/80 49/31 |
| 2013/0093141 A1* | 4/2013 | Guellec | B60J 10/75 277/637 |
| 2014/0157679 A1* | 6/2014 | Lee | B60J 10/248 49/490.1 |
| 2014/0290143 A1* | 10/2014 | Yamada | B60J 10/248 49/490.1 |
| 2016/0001646 A1* | 1/2016 | Yamada | B60J 5/0418 52/716.5 |
| 2017/0050504 A1* | 2/2017 | Nojiri | B60J 10/32 |

* cited by examiner

WEATHER STRIP MOUNTING STRUCTURE FOR DOOR IN VEHICLE

CROSS-REFERENCE TO RELATED APPLICATIONS

This application claims priority to Korean Patent Application No. 10-2017-0155118, filed on Nov. 20, 2017, which application is hereby incorporated herein by reference.

TECHNICAL FIELD

The present invention relates to a weather strip mounting structure for a door of a vehicle.

BACKGROUND

Generally, a weather strip for blocking the entry of foreign matter and noise from the outside into the interior of a vehicle is mounted along the periphery of the door between a door of a vehicle and a vehicle body.

Referring to a cross section taken along the line I-I shown in FIG. 1, as shown in FIG. 2, a weather strip 114 is installed along the periphery of the door 10 to seal air between the door 10 and the vehicle body, thereby preventing the entry of foreign matter and noise.

The door 10 includes a door frame 112 constituting the door along the perimeter of the door 10 and an inner panel joined to the inside of the door frame 112. A glass run 115 is mounted on the outside of the door frame 112, and a window glass 111 is installed in the glass run 115 so as to be movable up and down.

The door frame 112 and the inner panel 113 are machined into a convex shape inside the vehicle so that the inner panel 113 plays a role of is rigidity, and the door frame 112 and the inner panel 113 are surface-contacted with each other, respectively, at the upper end portions and the lower end portions of the door frame 112 and the inner panel 113 and then welded to form a hollow structure therein.

On the other hand, the inner panel 113 is formed with a weather strip hole 113a for fastening the weather strip 114 (refer to FIG. 3), and the weather strip 114 is fastened using the weather strip hole 113a. That is, as shown in FIG. 2, after mounting a clip 116 on the weather strip 114, the clip 116 is inserted into the weather strip hole 113a, thereby fastening the weather strip 114 to the door 10.

The weather strip 114 is closely contacted with the vehicle body, for example the roof panel 120, while being deformed at the close of the door 10, to keep air tightness.

However, there was a problem in which an additional process, such as a laser piercing process, is performed to form the weather strip hole 114a into which the clip 116 is inserted. After the inner panel 113 is fixed to the jig 133 by using the first clamp 131 and the second clamp 132 in order to form the weather strip hole 113a in the inner panel 113 and a copper is fixed to prevent the spatter from sticking therein, and then, the laser is irradiated through the laser tool 134 to form a weather strip hole 113a in the inner panel 113 (refer to FIG. 4)

In order to form the weather strip hole 113a, an additional process is performed, so that the time and expense required for the manufacture is further consumed, and a clip 116 for fitting the weather strip 114 into the weather strip hole 113a is additionally required and the process of mounting the clip 116 to the weather strip 114 should be added.

The foregoing is intended merely to aid in the understanding of the background of the present invention, and is not intended to mean that the present invention falls within the purview of the related art that is already known to those skilled in the art.

SUMMARY

Embodiments of the present invention relate to a mounting structure for a weather strip of a door for mounting the weather strip of the door blocking foreign matter and noise from entering the interior of a vehicle from outside on the door of the vehicle. Particularly embodiments relate to a mounting structure for a weather strip of a door in which the weather strip is directly mounted on an inner panel of the door.

Embodiments of the present invention can solve problems described above and provide a mounting structure for a weather strip of a door in which an inner panel of a door and a weather strip are directly coupled so that a clip for coupling is not required without machining a weather strip hole for fastening a weather strip to the inner panel.

A mounting structure for a weather strip of a door according to embodiments can be implemented so that a door frame is installed along circumference of the door of a vehicle. An inner panel is arranged inside the door frame, convexly formed to the inside of the vehicle and joined to the door frame. The weather strip is mounted on the inner panel along the circumference of the door. An upper portion of the door frame may be joined to an upper end portion of the inner panel while surrounding upper and lower surfaces of the upper end portion of the inner panel. An upper end portion of the door frame may be extended toward the inside of the vehicle to form a coupling portion to which the weather strip is coupled. A first coupling element, by which one side of the weather strip is fixed, may be formed at the coupling portion and a second coupling element, which is coupled with the first coupling element at the coupling portion, may be formed at the weather strip, so that the weather strip is directly coupled with the door frame.

The first coupling element may be a coupling hole formed to penetrate the coupling portion and the second coupling element may be a plurality of coupling lips formed to face the coupling portion from the inner side surface of a frame accommodating portion which accommodates the coupling portion at a lower portion of the weather strip.

The coupling lips may be disposed along the longitudinal direction of the coupling portion and at least one coupling lip may penetrate the coupling hole.

The coupling lips may be obliquely formed in the direction that the door frame is inserted into the frame accommodating portion.

The first coupling element may be a coupling hook bent upwardly from an end portion of the coupling portion and the second coupling element may be a hook penetration hole through which the coupling hook penetrates.

An end portion of the coupling hook may be formed of a hook shape.

The first coupling element may be a fixing groove concavely formed at the coupling portion and the second coupling element may be a fixing protrusion inserted into the fixing groove.

The first coupling element may be a fixing protrusion convexly formed at the coupling portion and the second coupling element may be a fixing groove into which the fixing protrusion is inserted.

The door frame may be machined by the hemming process and contacted with the upper surface and the lower surface of the inner panel, respectively.

The portion where the door frame and the upper surface and the lower surface of the inner panel are contacted with each other may be coated with a structure adhesive to be bonded.

According to the mounting structure for the weather strip of the door of embodiments of the present invention having the above configuration, the weather strip can be coupled to the inner panel of the door without a separate member such as a clip, thereby omitting the processes of forming hole and fastening clips.

As described above, since the process and the number of components are reduced, the manufacturing cost of the vehicle can be reduced.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF ILLUSTRATIVE EMBODIMENTS

Figure 1:
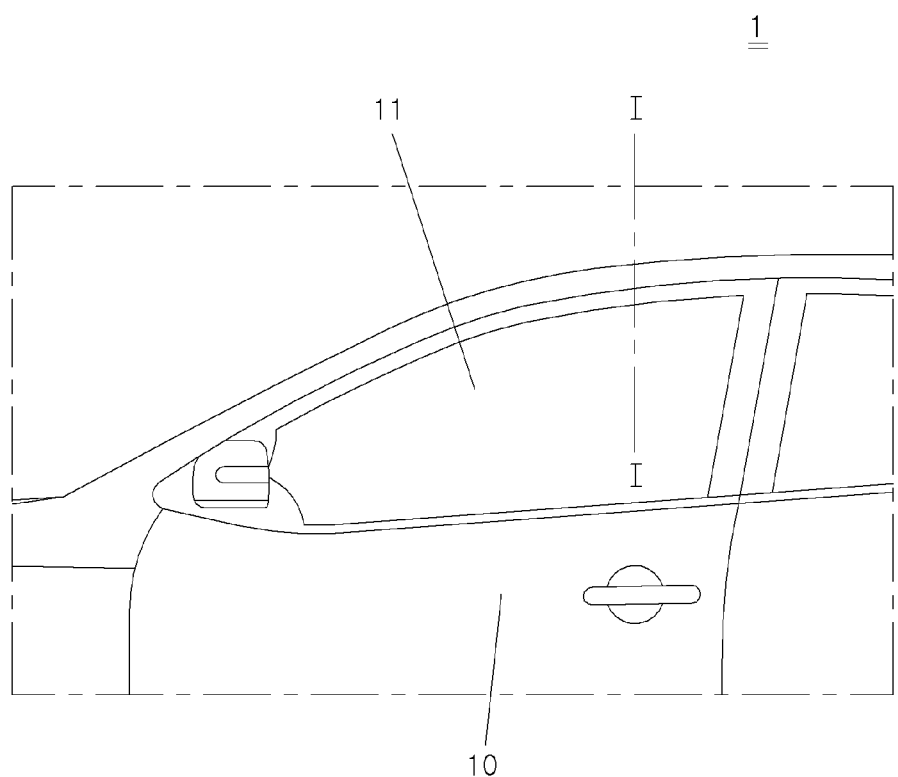
FIG. 1 is a side view showing a conventional door of a vehicle.
Figure 2:
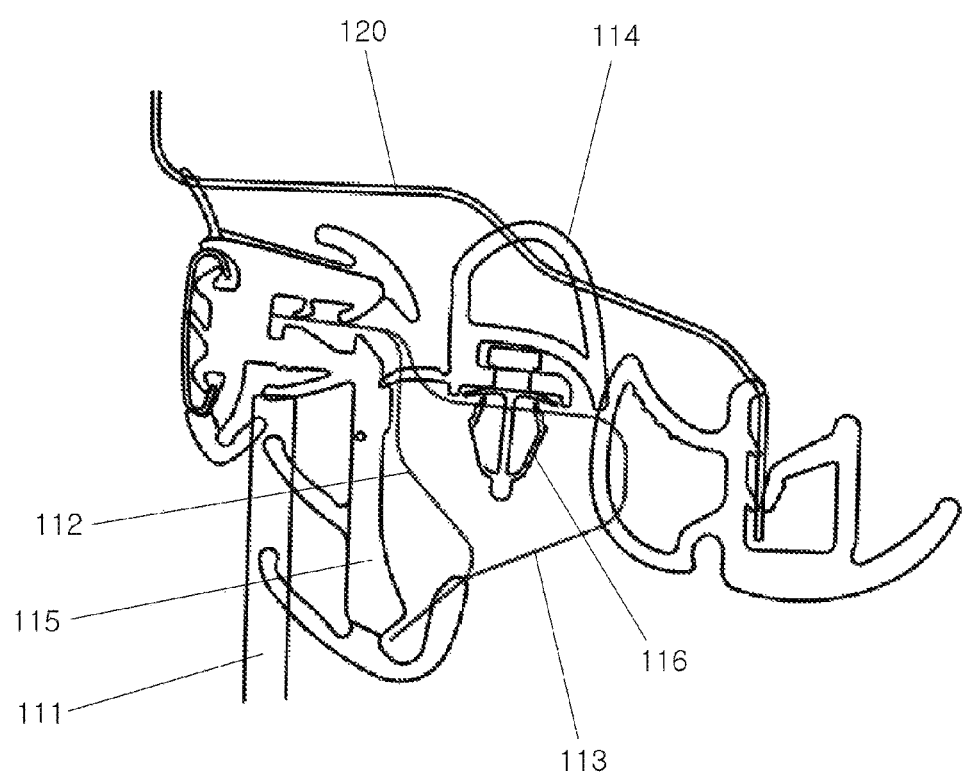
FIG. 2 is a cross-sectional view taken along the line I-I shown in FIG. 1.
Figure 3:
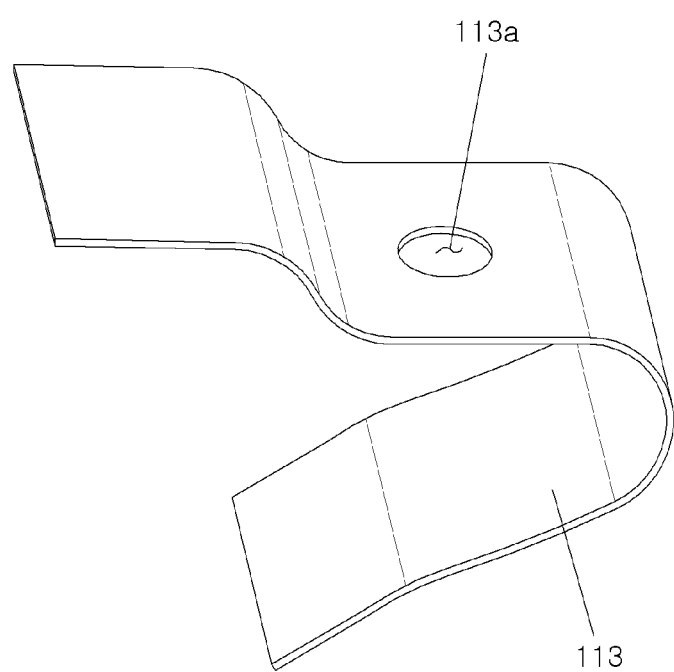
FIG. 3 is an enlarged perspective view of an inner panel of the door.
Figure 4:
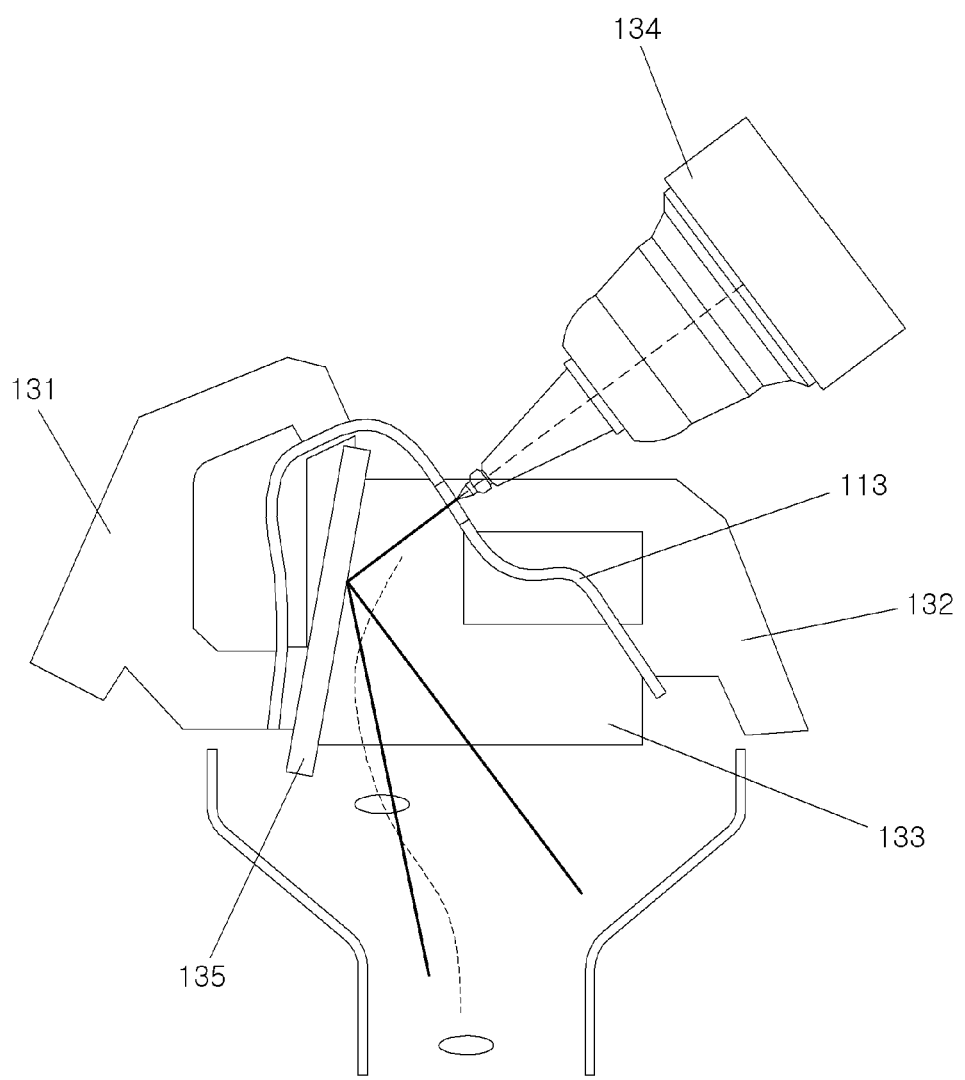
FIG. 4 is a cross-sectional view showing the process of machining a weather strip hole in an inner panel of a door.

Hereinafter, exemplary embodiments of the present invention will be described in detail with reference to the accompanying drawings. These embodiments are to be considered as illustrative and not restrictive, as those skilled in the art will readily appreciate that various modifications, additions and substitutions are possible, without departing from the scope and spirit of the invention as disclosed in the accompanying claims.

In a mounting structure for a weather strip of a door according to embodiments of the present invention, a door frame 12 may be coupled to an upper end portion of an inner panel 13 while an upper portion thereof surrounds the upper and lower surfaces of the upper end portion the inner panel 13. An upper end portion of the door frame 12 may be formed to be extended toward the inside of a vehicle 1 to form an coupling portion 12b to which a weather strip 14 is coupled. A first coupling element for fixing one side of the weather strip 14 may be formed at the coupling portion 12b. A second coupling element for coupling with the first coupling element may be formed at the weather strip 14. The weather strip 14 may be directly coupled to the door frame.

The door frame 12 and the inner panel 13 may be joined together to form a structure. A glass run 15 may be mounted on the outside of the door frame 12 and the window glass 11 may be moved upwardly and downwardly along the glass run 15.

The upper portion of the door frame 12 may be extended toward the inside of the vehicle, and the extended portion of the door frame 12 becomes the coupling portion 12b to which the weather strip 14 is coupled.

The inner panel 13 may be formed to be convex toward the inside the vehicle, and the upper portion and the lower portion of the inner panel 13 may be joined to the door frame 12.

In the door frame 12, the portion to which the inner panel 13 is joined, particularly the portion to be joined to the upper end portion of the inner panel 13, is subjected to hemming process. A hemming portion 12a may be formed by hemming process of the door frame 12 and the door frame 12 may be joined to the upper and lower surfaces of the upper portion of the inner panel 13 through hemming portion 12a.

On the other hand, the door frame 12 and the inner panel 13 may be welded, but the door frame 12 and the inner panel 13 may be joined using a structural adhesive (a).

That is, when the upper and lower surfaces of the inner panel 13 are bonded to the hemming portions 12a, respectively, a structural adhesive (a) is applied between the inner panel 13 and the door frame 12, and then, the door frame 12 and the inner panel 13 are bonded by the hardened structural adhesive (a).

Of course, the door frame 12 and the inner panel 13 can be joined by welding, riveting, etc. However, by using the structural adhesive (a), the joining operation becomes easy.

The weather strip 14 may be coupled to the door frame 12 along the circumference of the door 10 and the upper end portion of the weather strip 14 is closely contacted with the vehicle body, that is, a roof panel while deformed when the door is closed. The weather strip 14 may be coupled to the coupling portion 12b of the door frame 12. In order to couple the weather strip 14 on the coupling portion, a first coupling element may be formed on the coupling portion 12b to fix one side of the weather strip 14 and a second coupling element, which couples with the first coupling element, may be formed on the weather strip, so that the weather strip 14 may be directly coupled with the door frame 12.

Since the weather strip 14 is directly coupled with the door frame 12, there is no need for a member such as a clip, and the holes in the inner panel 13 need not be machined to insert the clip.

Hereinafter, the mounting structure for the weather strip according to the present invention will be described for each exemplary embodiment.

Figure 5:
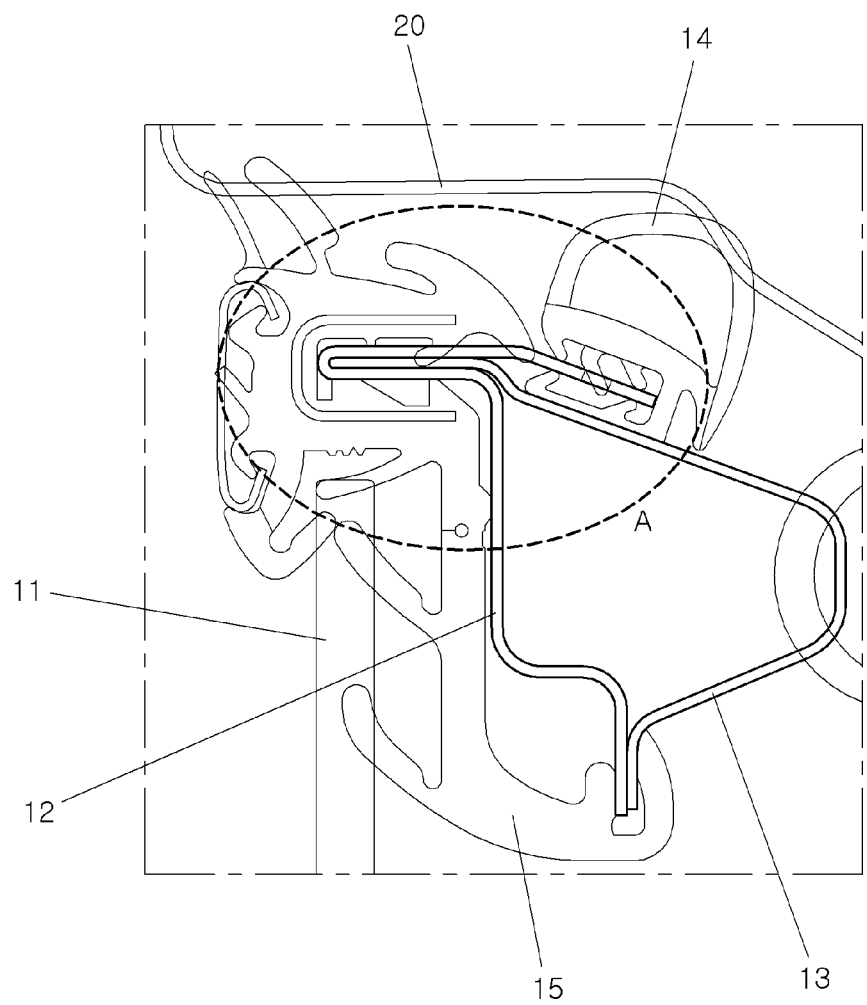
FIG. 5 is a cross-sectional view showing a mounting structure for a weather strip of a door according to the first exemplary embodiment of the present invention.
Figure 6:
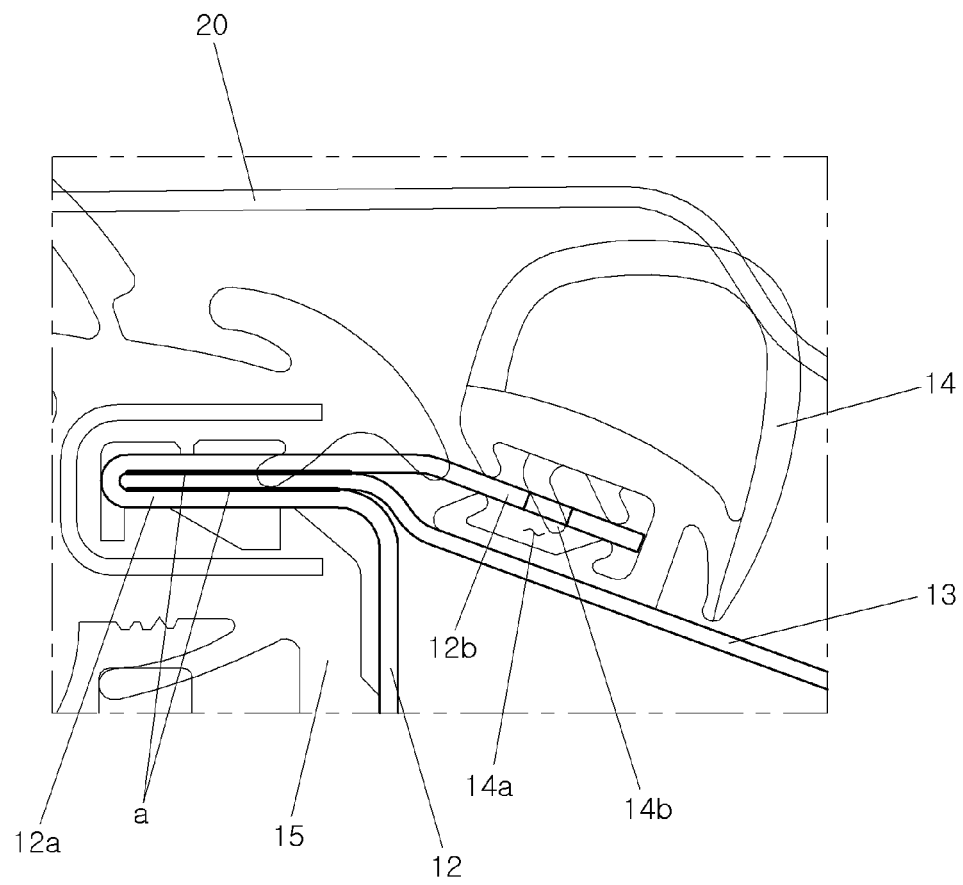
FIG. 6 is an enlarged view of a portion A shown in FIG. 5.
Figure 7:
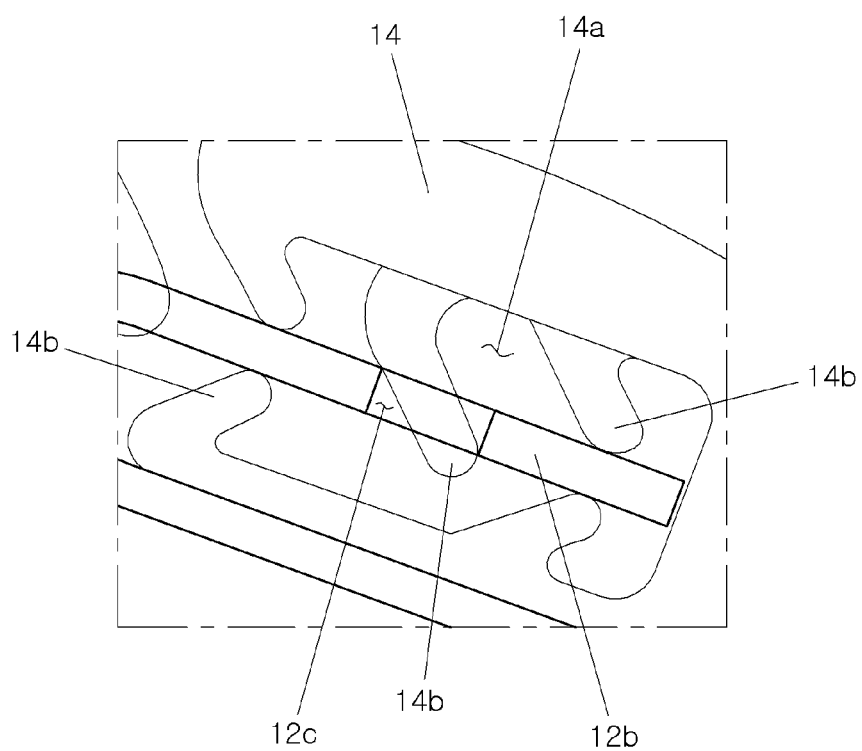
FIG. 7 is an enlarged view of a main portion shown in FIG. 6.

FIGS. 5 to 7 show the first exemplary embodiment of the mounting structure for the weather strip of the door according to the mounting structure for the weather strip of the door of the present invention.

The upper end portion of the door frame 12 may be extended to the inside of the vehicle. The portion extended from the upper end portion of the door frame 12 is inserted and fixed inside the weather strip 14.

The portion extended from the upper end portion of the door frame 12 to the inside of the vehicle may form the coupling portion 12b which is coupled with the weather strip 14.

The coupling portion 12b is arranged inside a frame accommodating portion 14a formed at the lower portion of the weather strip 14.

In the present exemplary embodiment, the first coupling element and the second coupling element which couple the weather strip 14 to the door frame 12, may be the coupling portion 12b of the door frame 12 and an coupling lip 14b formed at the frame accommodating portion 14a to be protruded, respectively.

At the lower portion of the weather strip 14 is formed the frame accommodating portion 14a which accommodates the coupling portion 12b. The coupling portion 12b is inserted into the frame accommodating portion 14a and the coupling portion 12b is maintained at the predetermined position in the frame accommodating portion 14a.

Even though the coupling portion 12b is inserted into the frame accommodating portion 14a formed in the weather strip 14, the upper and lower surfaces of the coupling portion 12b are spaced apart from the inner surface of the frame accommodating portion 14a.

At this time, a plurality of the coupling lip 14b may be formed to protrude from the inner surface of the frame accommodating portion 14a so as to be firmly supported inside the frame accommodating portion 14a.

The coupling lip 14b may be formed to protrude from the inner surface of the frame accommodating portion 14a toward the coupling portion 12b.

Meanwhile, in order to improve the coupling force by the coupling lip 14b, at least one of the coupling lips 14b penetrates the coupling portion 12b. In the coupling portion 12b, a coupling hole 12C may be formed so as to pass through the coupling portion 12b, and at least one of the coupling lips 14b, preferably positioned in the middle, passes through the coupling hole 12C.

In addition, the coupling lips 14b are all formed obliquely in the direction that the coupling portion 12b is inserted (left to right based on FIG. 7).

Thus, with the door frame 12 and the inner panel 13 be integrated with each other, the weather strip 14 is directly coupled to the coupling portion 12b of the door frame 12, a member (e.g., a clip) for fixing the weather strip 14 to the door frame as a structure or the inner panel is not required, and the machining process of the weather strip hole for joining this is also unnecessary, thereby simplifying the process.

Since the weather strip 14 is directly coupled to the door frame 12, the work process is simplified and the coupling force or function of the weather strip 14 is equalized.

Figure 8:
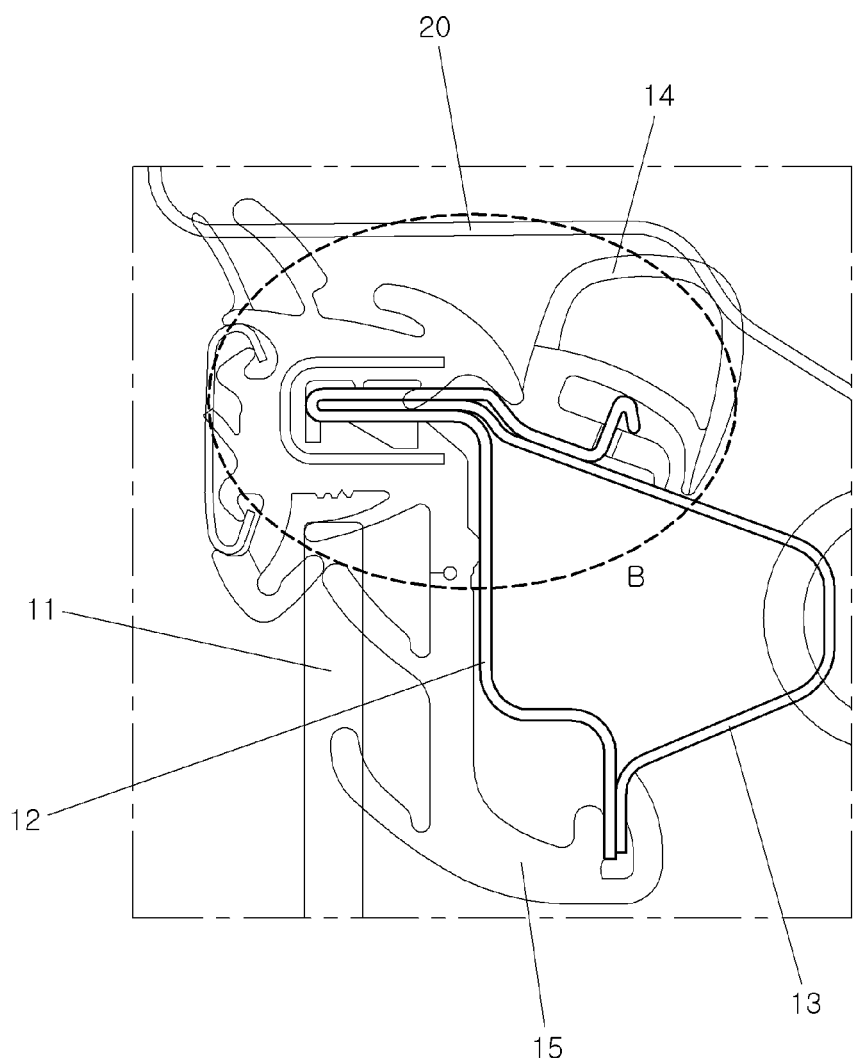
FIG. 8 is a cross-sectional view showing the mounting structure for the weather strip of the door according to the second exemplary embodiment of the present invention.
Figure 9:
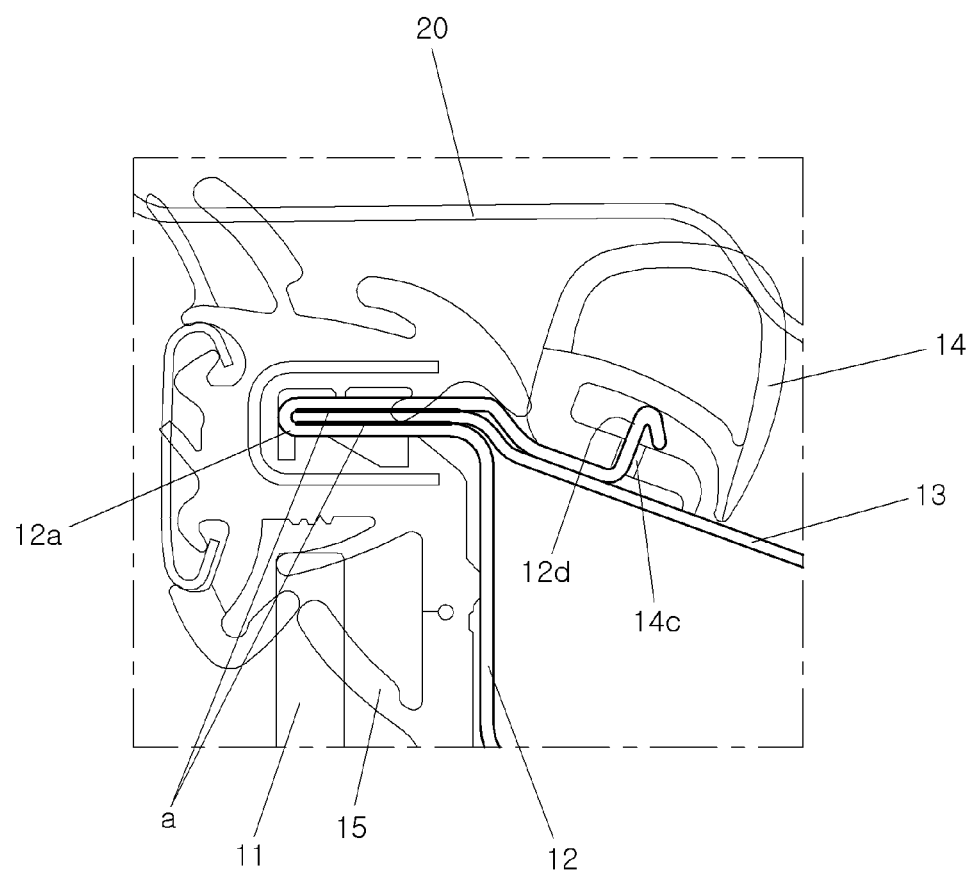
FIG. 9 is an enlarged view of a portion B shown in FIG. 8.
Figure 10:
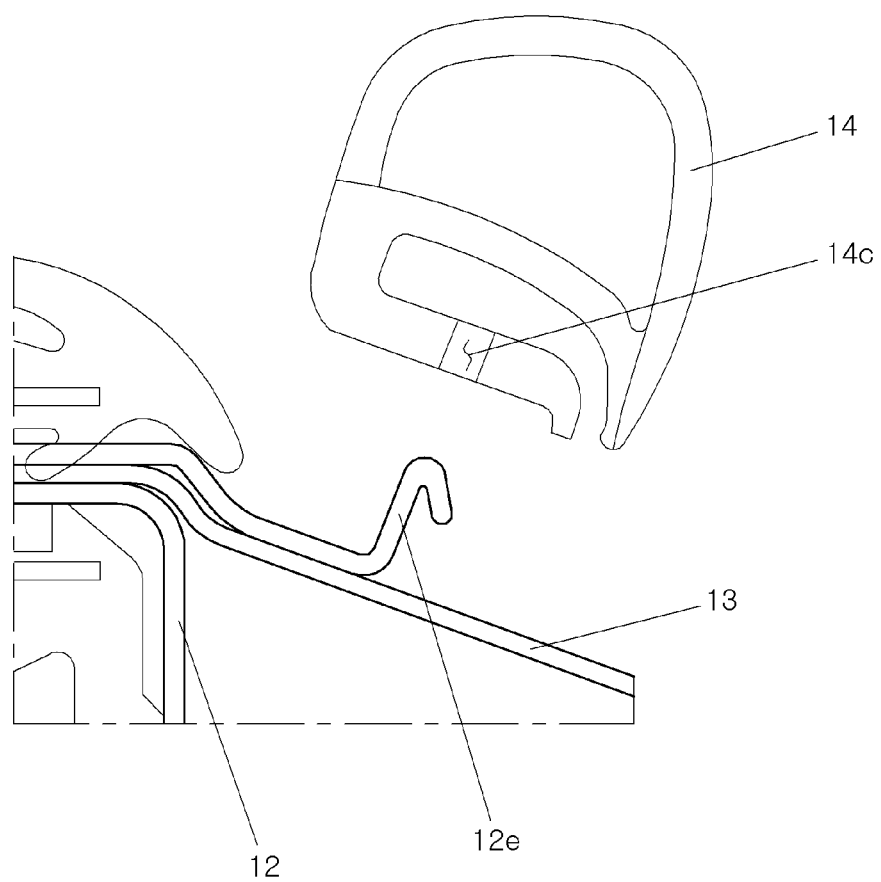
FIG. 10 is an enlarged view of a main portion shown in FIG. 9.

FIGS. 8 to 10 show the second exemplary embodiment of the mounting structure for the weather strip according to the present invention.

In the present exemplary embodiment, the first coupling element formed on the door frame 12 side may be a coupling hook 12d formed to be bent upward at an end portion of the coupling portion 12b. Also, the second coupling element formed on the weather strip 14 side may be a hook penetration hole 14c formed such that the coupling hook 12d penetrates the weather strip 14.

Since the shape and interconnection relationship between the door frame 12 and the inner panel 13 have been described above, detailed description thereof will be omitted. The upper end portion of the door frame 12 may be extended to the inside of the vehicle 1 and the hemming portion 12a formed through the hemming process may be joined to the upper and lower surfaces of the upper end portion of the inner panel 13 with a structural adhesive (a).

The end portion of the coupling portion 12b may be bent upward to form the coupling hook 12d. The coupling hook 12d may be bent to face the direction in which the weather strip 14 is inserted. Particularly, the end portion of the coupling hook 12d may be formed in the shape of a hook shape so as to prevent the detachment of the weather strip 14 fitted in the coupling hook 12d.

At the bottom surface of the weather strip 14, a hook penetration hole 14c may be formed so that the coupling hook 12d can penetrate. The coupling hook 12d passes through the hook penetration hole 14c so that the weather strip 14 maintains the state coupled with the coupling hook 12d by the hook shape formed at the end portion of the coupling hook 12d without separating from the coupling hook 12d.

Thus, when the weather strip 14 is inserted into the coupling hook 12d, the weather strip 14 maintains the state coupled with the door frame 12.

Figure 11:
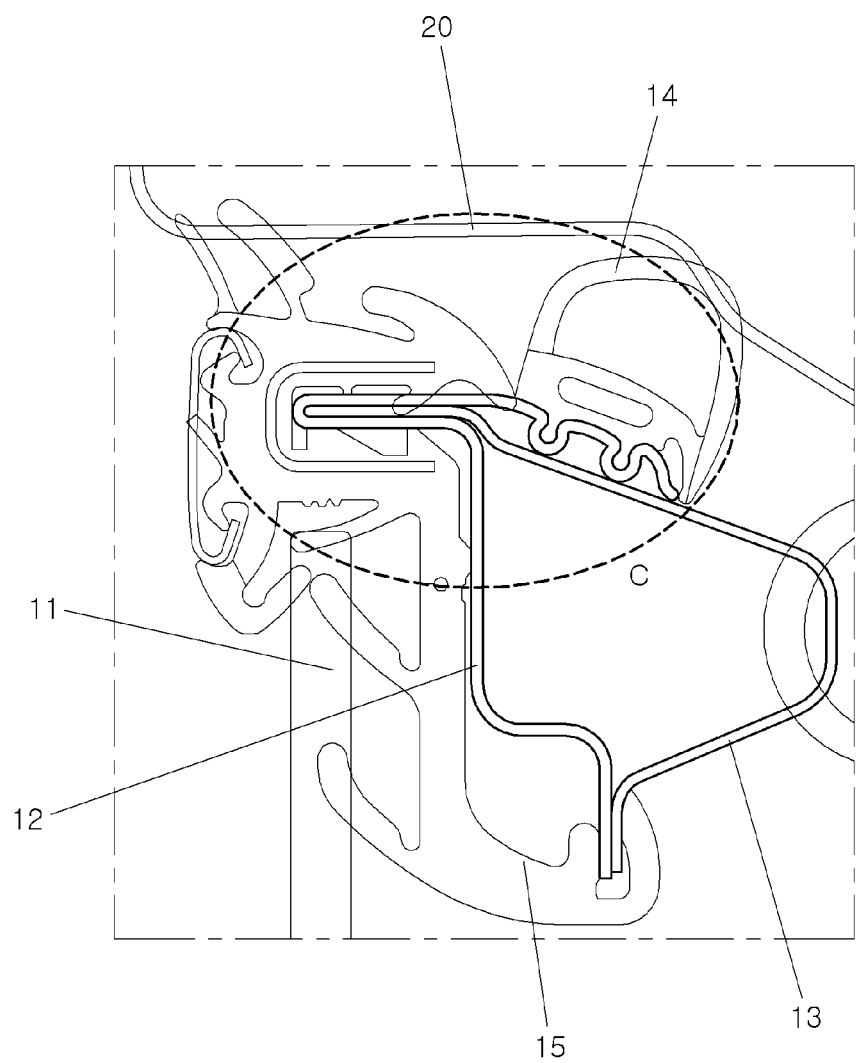
FIG. 11 is a cross-sectional view showing the mounting structure of the weather strip of the door according to the third exemplary embodiment of the present invention.
Figure 12:
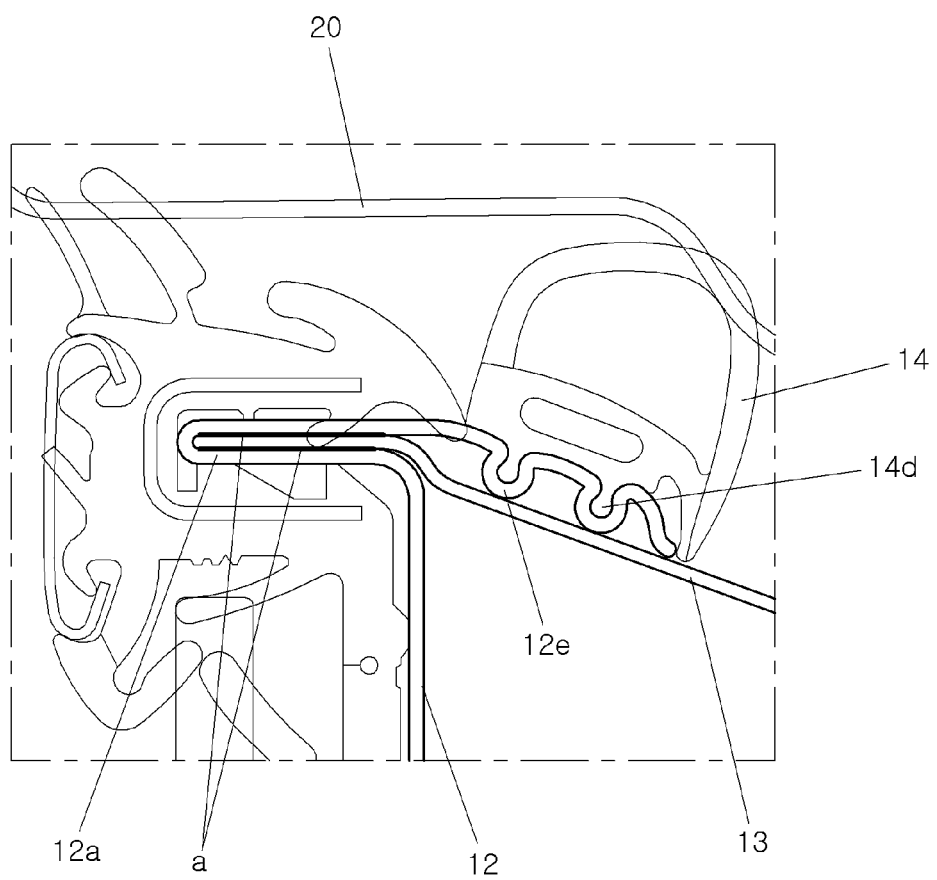
FIG. 12 is an enlarged view of a portion C shown in FIG. 11.
Figure 13:
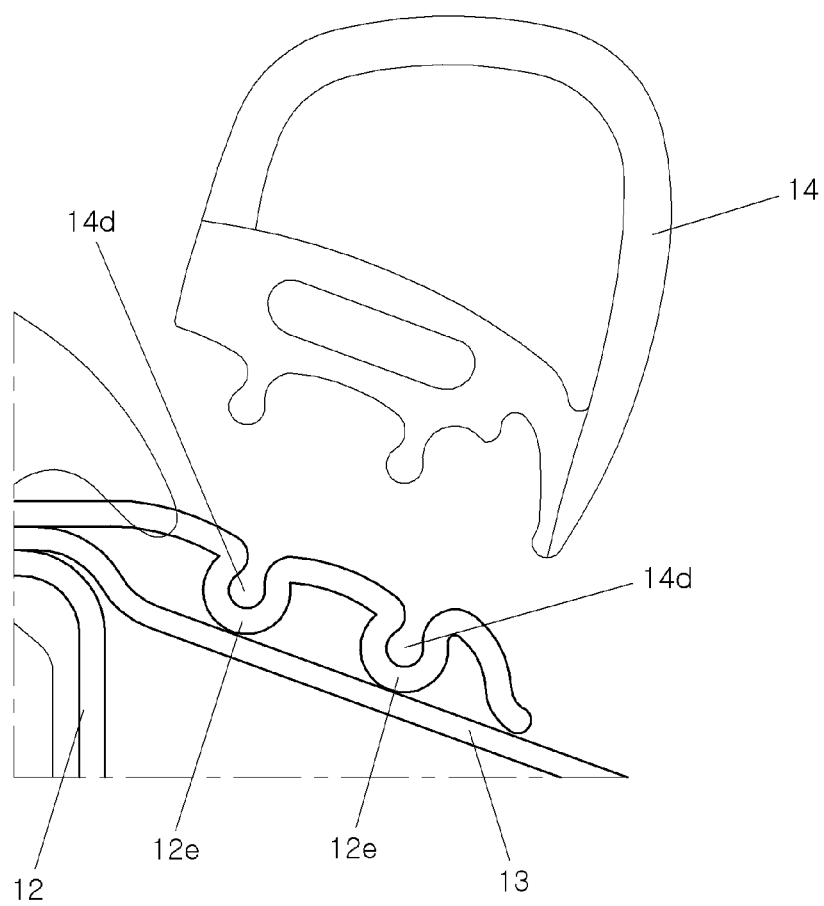
FIG. 13 is an enlarged view of a main portion shown in FIG. 12.

FIG. 11 to FIG. 13 show the third exemplary embodiment of the mounting structure for the weather strip according to the present invention.

In the third exemplary embodiment of the present invention, the first coupling element and the second coupling element may be a fixing groove 12e formed in one of the coupling portion 12b of the door frame 12 and the weather strip 14 and a fixing protrusion 14d may be formed in the other.

For example, as shown FIGS. 11 to 13, the weather strip 14 may be fixed to the door frame 12 by forming a fixing protrusion 14d which is formed concavely in the coupling portion 12b and inserted into the fixing groove 12e at the bottom surface of the weather strip 14.

The fixing groove 12e and the fixing protrusion 14d may be formed along the longitudinal direction of the weather strip 14.

Even in the present exemplary embodiment, the hemming portion 12a formed through a hemming process may be formed on an upper end portion of the door frame 12, and an upper end portion of the inner panel 13 is inserted into the hemming portion 12a, and then, bonded with a structural adhesive (a).

On the other hand, a fixing protrusion may be formed on the coupling portion 12b and a fixing groove may be formed on the weather strip 14. In other words, the weather strip 14 may be coupled to the coupling portion 12b of the door frame 12 by forming a convexly fixing protrusion in the coupling portion 12b and forming a fixing groove 12e in which the fixing protrusion fits in the weather strip 14.

What is claimed is:

1. A vehicle door that includes a mounting structure for a weather strip of the door, a door frame installed along a circumference of the door and an inner panel arranged inside the door frame formed convexly to the inside of the vehicle and joined to the door frame, the mounting structure comprising:
    a first coupling element fixing one side of the weather strip at a coupling portion of the door frame, the coupling portion formed by an upper end portion of the door frame that is extended toward the inside of the vehicle, an upper portion of the door frame being joined to an upper end portion of the inner panel while surrounding upper and lower surfaces of the upper end portion of the inner panel; and a second coupling element coupled with the first coupling element at the coupling portion so that the weather strip is directly coupled with the door frame by the first and second coupling elements, the weather strip being mounted at the inner panel along the circumference of the door, wherein the first coupling element is inserted into the second coupling element or the second coupling element is inserted into the first coupling element.

2. The vehicle door of claim 1, wherein:
the first coupling element is a coupling hook bent upwardly from an end portion of the coupling portion; and
the second coupling element is a hook penetration hole through, the coupling hook penetrating the hook penetration hole.

3. The vehicle door of claim 2, wherein an end portion of the coupling hook is formed of a hook shape.

4. The vehicle door of claim 1, wherein:
the first coupling element is a fixing groove concavely formed at the coupling portion; and
the second coupling element is a fixing protrusion inserted into the fixing groove.

5. The vehicle door of claim 1, wherein:
the first coupling element is a fixing protrusion convexly formed at the coupling portion; and
the second coupling element is a fixing groove into which the fixing protrusion is inserted.

6. The mounting structure for the weather strip of the door of claim 1, wherein the door frame is contacted with an upper surface and a lower surface of the inner panel, respectively.

7. The vehicle door of claim 1, wherein a portion where the door frame and an upper surface and a lower surface of the inner panel are contacted with each other is coated with a structure adhesive to be bonded.

8. A vehicle door that includes a mounting structure for a weather strip of the door, a door frame installed along a circumference of the door and an inner panel arranged inside the door frame formed convexly to the inside of the vehicle and joined to the door frame, the mounting structure comprising:
a first coupling element fixing one side of the weather strip at a coupling portion of the door frame, the coupling portion formed by an upper end portion of the door frame that is extended toward the inside of the vehicle, an upper portion of the door frame being joined to an upper end portion of the inner panel while surrounding upper and lower surfaces of the upper end portion of the inner panel, wherein the first coupling element is a coupling hole formed to penetrate the coupling portion; and
a second coupling element coupled with the first coupling element at the coupling portion so that the weather strip is directly coupled with the door frame by the first and second coupling elements, the weather strip being mounted at the inner panel along the circumference of the door, wherein the second coupling element is a plurality of coupling lips formed to face the coupling portion from an inner side surface of a frame accommodating portion, the frame accommodating portion accommodating the coupling portion at a lower portion of the weather strip.

9. The vehicle door of claim 8, wherein:
the coupling lips are disposed along a longitudinal direction of the coupling portion; and
at least one coupling lip penetrates the coupling hole.

10. The vehicle door of claim 8, wherein the coupling lips are obliquely formed in a direction that the door frame is inserted into the frame accommodating portion.

11. A vehicle comprising:
a door;
a door frame installed along a circumference of the door;
an inner panel arranged inside the door frame, convexly formed to the inside of the vehicle and joined to the door frame, wherein an upper portion of the door frame is joined to an upper end portion of the inner panel while surrounding upper and lower surfaces of the upper end portion of the inner panel and wherein the upper end portion of the door frame is extended toward the inside of the vehicle to form a coupling portion;
a weather strip mounted on the inner panel along the circumference of the door, the weather strip being coupled to the coupling portion of the inner panel;
a first coupling element fixing one side of the weather strip, the first coupling element formed at the coupling portion; and
a second coupling element coupled with the first coupling element at the coupling portion so that the weather strip is directly coupled with the door frame.

12. The vehicle of claim 11, wherein:
the first coupling element is a coupling hole formed to penetrate the coupling portion; and
the second coupling element is a plurality of coupling lips formed to face the coupling portion from an inner side surface of a frame accommodating portion which accommodates the coupling portion at a lower portion of the weather strip.

13. The vehicle of claim 12, wherein:
the coupling lips are disposed along a longitudinal direction of the coupling portion; and
at least one coupling lip penetrates the coupling hole.

14. The vehicle of claim 12, wherein the coupling lips are obliquely formed in a direction that the door frame is inserted into the frame accommodating portion.

15. The vehicle of claim 11, wherein:
the first coupling element is a coupling hook bent upwardly from an end portion of the coupling portion; and
the second coupling element is a hook penetration hole through which the coupling hook penetrates.

16. The vehicle of claim 15, wherein an end portion of the coupling hook is formed of a hook shape.

17. The vehicle of claim 11, wherein:
the first coupling element is a fixing groove concavely formed at the coupling portion; and
the second coupling element is a fixing protrusion inserted into the fixing groove.

18. The vehicle of claim 11, wherein:
the first coupling element is a fixing protrusion convexly formed at the coupling portion; and
the second coupling element is a fixing groove into which the fixing protrusion is inserted.

19. The vehicle of claim 11, wherein the door frame is contacted with an upper surface and a lower surface of the inner panel, respectively.

20. The vehicle of claim 11, wherein a portion where the door frame and an upper surface and a lower surface of the inner panel are contacted with each other is coated with a structure adhesive to be bonded.

* * * * *